Jan. 20, 1970 — O. J. BROW — 3,491,183
METHOD OF ASSEMBLING A FASTENER ON A HEAT-SOFTENABLE BOSS
Filed Nov. 24, 1967

INVENTOR.
Orville J. Brow
BY
P. A. Faucher
ATTORNEY

United States Patent Office 3,491,183
Patented Jan. 20, 1970

3,491,183
METHOD OF ASSEMBLING A FASTENER ON A HEAT-SOFTENABLE BOSS
Orville J. Brow, Taylor, Mich., assignor to General Motors Corporation, Detroit, Mich., a corporation of Delaware
Filed Nov. 24, 1967, Ser. No. 685,681
Int. Cl. B28b 11/08; B23p 11/00
U.S. Cl. 264—249
4 Claims

ABSTRACT OF THE DISCLOSURE

The invention relates to a method of permanently securing a metal fastener to a heat-softenable plastic member. Heat is applied to the metal fastener to soften the plastic member allowing retaining means on the fastener to be embedded in the plastic member to provide a permanent securing arrangement.

---

The prior art as shown by the U.S. patents to Lanius, No. 3,032,807, and to Soltysik, No. 3,135,309, discloses metal fasteners clamped or mounted on a metal stud or boss. The fastener is clamped on the stud by gripping means such as teeth or prongs gripping the stud. As is readily apparent, the gripping means remain under tension after assembly and would, after a period of time, become fatigued.

It is well known that plastic is being used to a greater extent in the automobile industry, as well as all other industries. The techniques of assembling fasteners to plastic studs or bosses to obtain the maximum holding power are different than the assembly of fasteners to metal studs, as in the prior art. This is so because the gripping means on the fastener necessary to effect the gripping action in the present invention, as in the prior art, is smaller than the member to which it is attached and therefore, the gripping means will scrape away or remove part of the plastic boss material in the area of the gripping means during assembly. This obviously does not occur when assembling a similar fastener to metal. Because of this, the holding power of the gripping means is diminished and weakened. Unless a permanent gripping or attaching arrangement is provided, it would be easier to pull or remove a fastener from a plastic boss than from a metal one when pressure or force is applied, because of the general softness and nature of plastics, per se, and because of the erosion or scraping away of the boss at the gripping means during assembly. Also, to insure longer fastener life, the tension in the fastener gripping means must be relieved to reduce fatigue.

It is therefore an object of the present invention to provide a method of permanently attaching a separable fastener having gripping means to a heat-softenable boss.

It is another object to press a separable fastener having gripping means on a heat-softenable plastic boss to provide initial tension on the gripping means of the fastener and to apply heat to the mounted fastener to soften the plastic boss, allowing the fastener gripping means to be embedded in the boss and thereby be relieved of tension.

Figure 1:
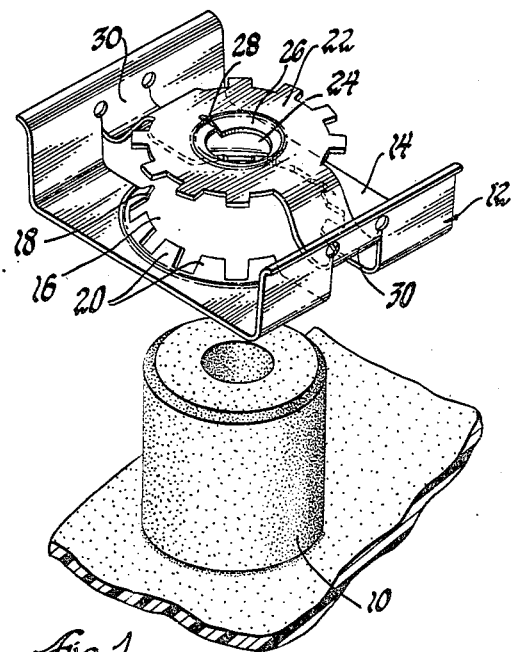
Figure 3:
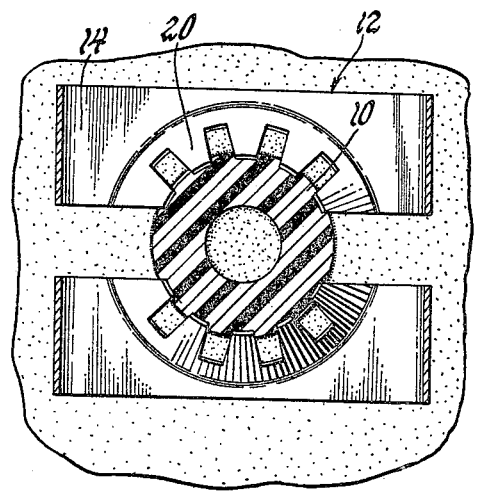
Figure 2:
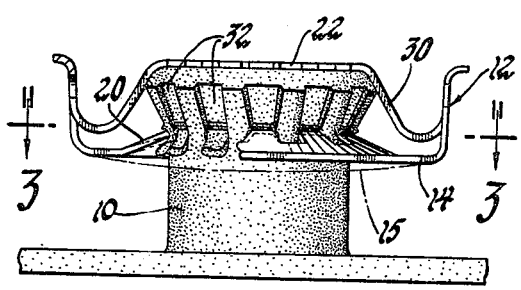
Figure 4:
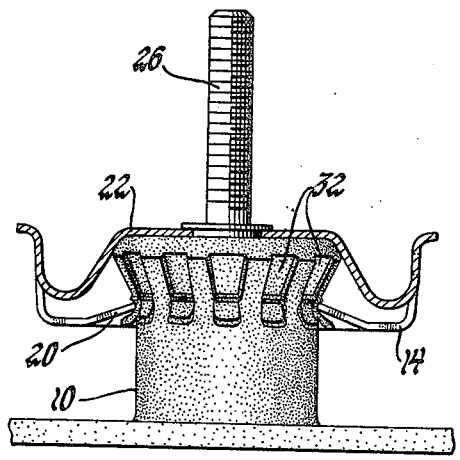
Figure 5:
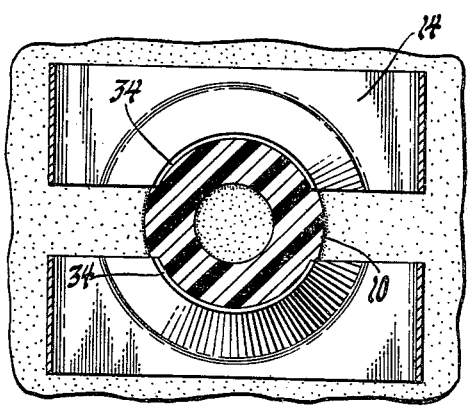

FIGURE 1 is a perspective view of the fastener and a boss shown prior to mounting;
FIGURE 2 is a side-elevational view of the fastener mounted on the boss partly broken away;
FIGURE 3 is a top view taken along line 3—3 of FIGURE 2, showing the fastener gripping means embedded in the boss;
FIGURE 4 is a front-elevational view showing a male fastener mounted on a boss partly broken away; and
FIGURE 5 is a top view of another embodiment of fastener gripping means.

The invention is directed to the method of mounting fastener 12 to boss 10, therefore, the following description relative to the fastener and boss is provided primarily as background material so that the invention can be better understood.

Referring to FIGURE 1, there is shown a hollow boss or stud member 10, which boss or stud may be formed on an assembly such as a shelf center, or the like, or on any other area requiring the use of a plastic boss to hold a fastener. The boss may be made of any heat-softenable material, i.e., hard rubber, plastic material such as polypropylene, or the like, and is larger than the fastener mounted on it to insure a gripping action. Fastener 12, well known in the art, has a base 14 having a center aperture 16. The intermarginal edges 18 of base 14 represent the gripping means, shown as a plurality of toothed elements 20, referred to as fingers, which extend inwardly and upwardly relative to base 14.

Axially spaced from base 14 is a plate or planar member 22 substantially parallel to base 14. The planar member 22 is centrally apertured as at 24 and is provided with a screw thread engaging means 26. The screw threaded engaging means 26 is radially slotted at 28 and helically disposed to accommodate a complementary screw. The fastener of the type disclosed can be fabricated from a flat sheet metal blank. The planar member 22 and the arms 30 are struck from the sheet metal blank forming the base 14 and edges 18.

As shown in FIGURE 4, a screw 26 may be mounted on planar member 22 by interference fit or by welding, or the like, to form a male fastener means in place of the female fastening means as described above. An electrical solder lug, rivet, or the like, may also be provided.

In mounting and securing the fastener 12 to boss 10, fastener 12 is pressed onto the boss 10. Any suitable means may be used to press fastener 12 onto boss 10. As the fastener 12 is pressed onto boss 10 and into the assembled position, fingers 20 dig into and form grooves 32 in the boss. Planar member 22, having the female screw engaging portion therein, rests on the top of the boss when the fastener is pressed thereon and acts as a stop as well as the screw engaging means. Because fingers 20 define an aperture of a smaller size than the boss 10, they are distorted toward member 22 which, in effect, puts the fingers 20 under tension. Additional pressure may be applied to also put the base 14 under tension as shown by the dotted line 15 in FIGURE 2. After the fastener is assembled to the boss, the means used to press the fastener onto boss 10 is removed.

Suitable means such as an induction heating unit or a fastener contacting heating device, or the like, is used to heat and soften the plastic boss 10. The fingers 20 on the fastener 12, which are under tension as previously explained, relax and the fingers are embedded into the heated and softened boss at the bottom of the formed grooves and are thereby relieved of tension. As explained in the above paragraph, enough tension may be provided to base 14 and fingers 20 to force planar member 22 down on the top of the boss so that as the base and fingers are relieved of tension and the fingers are embedded into the boss, the portion of the boss above the fingers is squeezed toward the embedded fingers to form a mushroom or flared distorted area adjacent the fingers, which aids in locking the fastener 12 against vertical as well as lateral, or circular, movement on and around the boss. The heat applied to the fastener-boss assembly is removed after the fingers are embedded in the boss, and the assembly is allowed to cool.

As understood, to practice the invention, any suitable design other than a plurality of fingers, such as a solid segmented arcuate gripping means, as shown at 34 in FIGURE 5, may be used in securing the fastener onto boss 10, as well as any suitable means may be used to effect a heating and softening of boss 10. As is further understood, the heating means may also be used to press the fastener onto the boss.

The invention provides for an improved method of permanently retaining fastener means and, it is understood, that the types of fasteners used in practicing the method are not to be limited to the exact embodiments shown, but that various types of fasteners may be used without departing from the field and scope of the method designated in the appended claims.

I claim:
1. A method of assembling a metal fastener, having spaced radially extending gripping means, on a boss formed of a heat-softenable material, the steps comprising:
   pressing the metal fastener on said boss wherein said gripping means are displaced and put into tension, by reason of there being an interference fit between said gripping means and said boss;
   heating said boss to soften the material thereof, whereby said gripping means move inwardly to embed therein and are relieved of tension; and
   cooling said assembly to harden the softened material and thereby permanently secure said fastener on said boss.

2. A method of assembling a metal fastener, having spaced radially extending gripping means, to a heat-softenable plastic boss to permanently secure the fastener thereto, the steps comprising:
   pressing said fastener over said boss wherein grooves are formed in said boss, and the gripping means are displaced and put under tension;
   heating said fastener, to thereby soften said boss adjacent said gripping means, whereby said gripping means move inwardly and are embedded into said boss at the bottom of the groove formed in said boss and are thereby relieved of tension;
   removing the heat from said fastener; and
   cooling said fastener and boss to harden the softened boss, whereby said fastener is locked on said boss.

3. A method of assembling a metal fastener, having spaced radially extending gripping means, to a heat-softenable plastic boss to permanently secure the fastener thereto, the steps comprising:
   pressing said fastener over said boss;
   grooving said boss by said gripping means scraping away a portion of said boss in the area of the gripping means as the fastener is being pressed on said boss;
   tensioning said gripping means by displacing same as said fastener is pressed on said boss, by interference fitting said fastener on said boss;
   heating said fastener, to thereby soften said boss adjacent said gripping means, wherein said gripping means move inwardly and are embedded into said boss, thereby forming a flared end on said boss along the grooves in said boss at the gripping means and are thereby relieved of tension;
   removing the heat from said fastener; and
   cooling said fastener to harden the flared end thereby permanently securing said fastener on said boss.

4. The method of assembling a metal fastener having a base, as set forth in claim 3, wherein said base is bowed under pressure as tension is applied to said gripping means.

References Cited

UNITED STATES PATENTS

| | | | |
|---|---|---|---|
| 1,200,992 | 10/1916 | Searles | 264—249 |
| 2,041,518 | 5/1936 | Salz | 264—249 X |
| 2,712,262 | 7/1955 | Knohl | 85—36 |
| 2,859,511 | 11/1958 | Gallagher et al. | 29—432 |
| 2,913,951 | 11/1959 | Van Buren | 85—36 |
| 3,135,309 | 6/1964 | Soltysik | 151—41.75 |
| 3,265,781 | 8/1966 | Peterson | 264—249 X |
| 3,297,072 | 1/1967 | Galer | 85—36 X |
| 3,342,237 | 7/1967 | Meehan | 151—41.75 |

CHARLIE T. MOON, Primary Examiner

U.S. Cl. X.R.

29—432.1, 517, 525; 85—36; 151—41.73, 41.75; 264—293